United States Patent
Maddison et al.

(10) Patent No.: US 8,467,590 B2
(45) Date of Patent: Jun. 18, 2013

(54) MICROSCOPY ANALYSIS TECHNIQUE

(75) Inventors: John Maddison, Sussex (GB); Havard Danielsen, Oslo (NO)

(73) Assignee: Institute for Medical Informatics, Oslo (NO)

( * ) Notice: Subject to any disclaimer, the term of this patent is extended or adjusted under 35 U.S.C. 154(b) by 211 days.

(21) Appl. No.: 13/152,143

(22) Filed: Jun. 2, 2011

(65) Prior Publication Data

US 2012/0114216 A1     May 10, 2012

(30) Foreign Application Priority Data

Nov. 5, 2010   (GB) .................................. 1018695.5

(51) Int. Cl.
*G06K 9/00*      (2006.01)

(52) U.S. Cl.
USPC .......................................................... 382/133

(58) Field of Classification Search
USPC ........ 382/128–134; 128/920–925; 356/39–49; 600/407–414, 424–426; 345/581–618
See application file for complete search history.

(56) References Cited

U.S. PATENT DOCUMENTS

| | | | |
|---|---|---|---|
| 4,453,226 | A | 6/1984 | Hobbs et al. |
| 2005/0013471 | A1 | 1/2005 | Snoeren |
| 2007/0100562 | A1 | 5/2007 | Bartels et al. |
| 2009/0285461 | A1 | 11/2009 | Bohm et al. |

*Primary Examiner* — Atiba O Fitzpatrick
(74) *Attorney, Agent, or Firm* — Leason Ellis LLP

(57) ABSTRACT

A method and apparatus for the analysis of cell nuclei may use a system where images captured from a bright field microscope are analysed and information is retrieved that give quantitative information of the different type of chromatin within the cell nuclei for example Hetrochromatin and Euchromatin. The method is based on segmented cell nuclei. Quantitative information is determined related to the grey-scale distribution of the different areas of the chromatin types and the object structure within these different areas.

15 Claims, 3 Drawing Sheets

MICROSCOPY ANALYSIS TECHNIQUE

BACKGROUND TO THE INVENTION

As is well known, a cell contains three compartments, the membrane, the cytoplasm and cell nuclei. The cell membrane is the external interface of the cell, the cell nucleus is the functional centre of the cell and the cytoplasm is the area in between. Chromatin is a structure within the cell nuclei.

The chromatin is the active part of the nuclei and its structure is representative of activity within the nuclei. The quantitative analysis of this structure can give an indication of the state of the cell. In order for the nuclei to be successfully visualised it first has to be subjected to various laboratory methods and the image captured. The image then needs to be segmented to identify and separate out the nuclei so the nuclei can be individually analysed.

It can be appreciated that methods allowing the characterisation of cell nuclei have drug discovery, clinical and other medical applications.

SUMMARY OF THE INVENTION

According to the invention there is provided a method according to claim 1.

The analysis that is performed by the present invention allows for the specific analysis and measurement of the known different types of chromatin both as absolute measures and relative to each other.

The present invention allows for quantitative information to be obtained relating to the different type of chromatin within a cell nucleus.

BRIEF DESCRIPTION OF THE DRAWINGS

For a better understanding of the invention, embodiments will now be described, purely by way of example, with reference to the accompanying drawings, in which{

DESCRIPTION

The present embodiment uses microscopy equipment and digital image capture equipment for the analysis of cell nuclei, specifically the chromatin within the nuclei in order to obtain quantitative information about the chromatin structure within the cell nuclei. The embodiment uses the grey scale intensity data from the prepared nuclei to complete the analysis.

The preferred embodiment related to a system where images captured from a bright field microscope are analysed and information is calculated that gives quantitative information of two of the different types of chromatin within the cell nuclei, Hetrochromatin and Euchromatin.

FIG. 1 to FIG. 4 show the inputs and outputs of the system and FIG. 5 shows a flow diagram of the process completed according to the present invention.

Cell specimens are first prepared using standard laboratory procedures to make a mono-layer stained using the Feulgen method (http://en.wikipedia.org/wiki/Feulgen), (http://www.jgp.org/cgi/content/abstract/33/2/125).

The prepared specimen is placed onto a microscope, located correctly using a computer controlled stage device and an imaging device. The personal computer programmed by computer software according to the embodiment controls the stage driving the specimen and hence the location of the slide under the microscope. The personal computer drives the stage to the required position and the digital camera is used to capture the image once the specimen is in the required location.

The computer is used to control the digital camera and also to complete the subsequent analysis.

A field of view is captured from a microscope using a digital imaging device (1). This may be a colour or a black and white greyscale image. In the case of the colour image, the embodiment converts the image to total intensity values, effectively a greyscale, for further processing.

Figure 1:
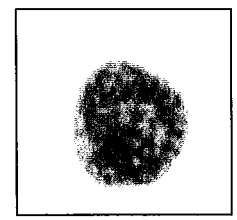
FIG. 1 shows a cell nuclei captured from a light microscope using a digital camera a segmented.

From the field of view cell nuclei are segmented from the field of view so the individual cell nuclei can be analyzed (2) as shown in FIG. 1. The individual nuclei are segmented in the described embodiment using histogram based methods. Suitable methods are known to those skilled in the art—see for example http://en.wikipedia.org/wiki/Segmentation_%28image_processing%29, although those skilled in the art will appreciate that other methods are available.

Figure 2:
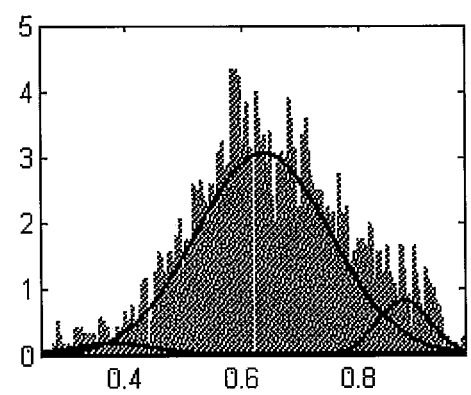
FIG. 2 shows automatically fitted Gaussian curves

Within the cell nucleus as identified by segmentation, the intensity of each pixel is plotted as a histogram as shown in FIG. 2. As will be seen, the histogram of FIG. 2 is normalised so that the minimum intensity pixel is given a value 0 and the maximum intensity pixel a value 1.

There are two main types of chromatin within cell nuclei (Hetrochromatin and Euchromatin). The Heterochromatin is darker than the Euchromatin, which is accordingly alternatively referred to as light chromatin. In order for the histogram of these to be measured in absolute terms and relative to each other three Gaussian curves are automatically fitted to the histogram using Multivariant Gaussian distribution (http://www.answers.com/topic/multivariate-normal-distribution?cat=technology). FIG. 2 shows the three dark lines which are the detected Gaussian distributions.

The result of these is shown in FIG. 2 shows the intensity of Hetrochromatin, Light chromatin and the background in the successive peaks. From these fitted curves absolute and relative values are calculated (4) and can include:

1. Mean intensity of the histogram peaks
2. Sigma value of the histogram peeks
3. Comparative magnitude of the histogram peaks
4. Ratio of the magnitude of the first and second peak
5. Ratio of the magnitude of the second and third peak
6. Ratio of the magnitude of the third and first peak
7. The area of the peaks, calculated by:

$$\text{Area} = \int_{x=\mu+\sigma}^{x=\mu-\sigma} \frac{1}{\sigma\sqrt{2\pi}} \exp\left(-\frac{(x-\mu)^2}{2\sigma^2}\right) dx$$

where $\sigma$ is Sigma, $\mu$ the mean of the peak. (http://en.wikipedia.org/wiki/Normal distribution)

8. Ratio of the area of the first and second peak
9. Ratio of the area of the second and third peak
10. Ratio of the area of the third and first peak These values are saved as characteristic data representing the nucleus.

In a preferred embodiment, all the above characteristics are saved, but in less preferred embodiments some of these characteristics are saved—this may be at least three of the characteristics, preferably at least six and further preferably at least nine of these characteristics.

Figure 3A:
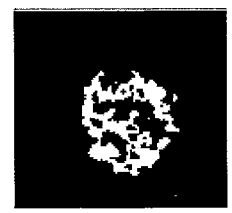
FIG. 3a shows a first segmented object representing the area of Euchromatin
Figure 3B:
FIG. 3b shows a second segmented object representing the area of Hetreochromatin
Figure 4:
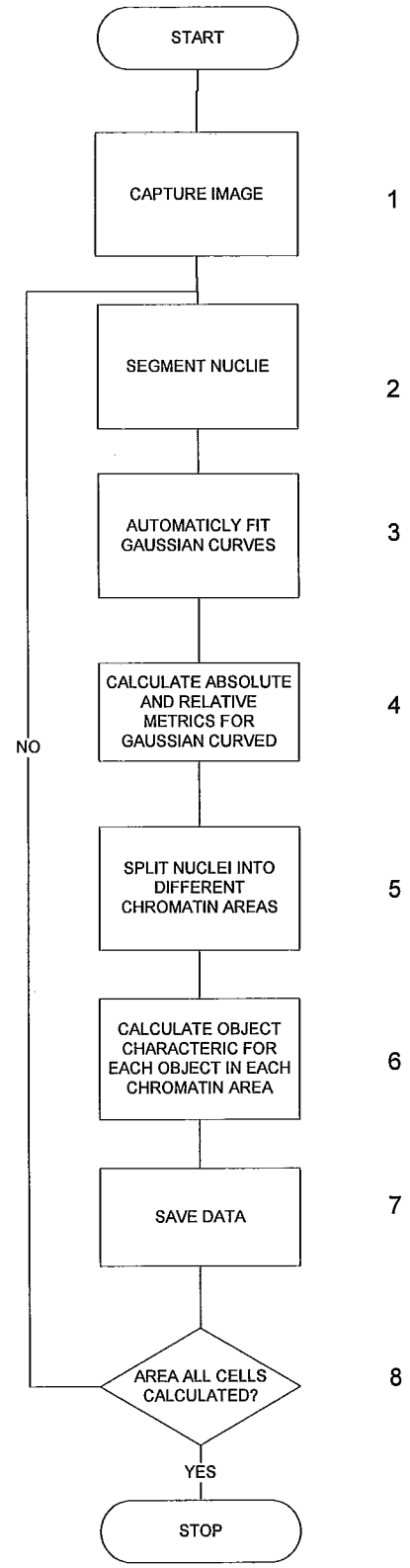
FIG. 4 shows a flow diagram of a process according to an embodiment.

The images of the nuclei as shown in FIG. 1 are further segmented automatically so that the individual objects with the different chromatin areas (5) shown in FIG. 3a and FIG. 3b of the nuclei can be individually subject to further analysis (6).

To do this, the histogram is split into regions as calculated by the Gaussian curve fitting.

The pixels in the image are divided by intensity. The pixels having an intensity from the lowest intensity in the image to a first determined value are assigned to be dark chromatin and the pixels having an intensity from the first determined value to a second determined value are assigned to be light chromatin. The first and second determined values are determined from the fitting parameters. In the embodiment, the first determined value is the midpoint between the first peak and the second peak and the second determined value is the midpoint between the second and third peaks.

Those skilled in the art will realise that there are other methods to determine the best threshold positions given histogram mean values, such as the standard deviation of the fitted Gaussian curves.

The regions of the nuclei with each of these intensity ranges are separated to produce two images—these images are shown in FIG. 3a (Darkest chromatin) and FIG. 3b (Lightest chromatin). Thus, the pixels in the lowest intensity range up to the first determined value make up the shape shown in FIG. 3a and the pixels in the higher intensity range between the first and the second determined values make up the shape shown in FIG. 3b. The processing then calculates parameters related to these shapes.

For each of the detected shapes, i.e. blobs, within the cell and the Chromatin area morphological (i.e. shape) characteristics are calculated. In the embodiment, this is carried out using "Mathworks", a mathematical toolbox, and in particular the image processing toolbox. Further details of this toolbox are available at:

http://www.mathworks.com/access/helpdesk/help/toolbox/images/index.html?/access/he lpdesk/help/toolbox/imaqes/regionprops.html The characteristics measured can include:
1. Area—Area of the object
2. Centroid—Centroid of the object
3. MajorAxisLength—The length in pixels of the major axis
4. MinorAxisLength—The length in pixels of the minor axis
5. Eccentricity—The ration of the distance between the foci of the major and minor axis.
6. ConvexArea—The area of the convex hull representation of the object
7. FilledArea—The area of the area contained within the boundary of the object
8. EquivDiameter—The equivalent diameter of a circle with the same area
9. Solidity—The proportion of the area of the convex hull that are also in the object
10. Extent—The proportion of the area of object that are in the bounding box
11. Perimeter—Perimeter of the object The combined information is then saved (7) within the characteristic data of the nucleus concerned.

In a preferred embodiment, all the above characteristics are saved, but in less preferred embodiments some of these characteristics are saved—this may be at least three of the characteristics, preferably at least six and further preferably at least nine of these characteristics.

The process is then repeated for each identified nucleus to collect information about the nuclei.

In the preferred embodiment of the present invention the imaging equipment consists of a bright field/optical microscope connected to a digital imaging device. (http://en.wikipedia.org/wiki/Microscope#Optical microscopes). The specimens used in the preferred embodiment is a Feulgen stained monolayer.

The bright field microscope such as a Axiolmager (Zeiss, Germany) (http://www.zeiss.com/c12567be0045acf1/Contents-Frame/f70396ab9c6e8f75c1256f230058ce5b) is equipped with a 40× objective lens. The imaging device used can be a 2D array device such as the C7780 (Hamamatsu Photonics, Japan), a person skilled in the art will appreciate that a virtual microscope device as taught in EP-A-0 994 433 can also be used as an image source.

Although the embodiment described uses three gaussians, it may only be necessary to fit to two gaussians corresponding to the dark and bright pixels. Alternatively, in some cases fitting to more features may be useful.

Further, although the embodiments described process using the total intensity to ease processing, variants of the invention can process colour images using the intensity of different colours to provide further information and characteristics.

Nothing given in the illustrative explanation is intended to limit the scope of the claims.

The invention claimed is:

1. A method of quantitative analysis of cell nuclei, comprising:
   capturing an image of cell nuclei;
   segmenting the image to identify individual nuclei;
   fitting three intensity peaks of the pixels of the image of individual nuclei to the histogram of number of counts against image intensity, the three intensity peaks being low, middle and high intensity peaks and being represented by fitting parameters;
   determining characteristic data, wherein some of the characteristic data is determined from the fitting parameters'; and
   separating the image of the individual nuclei by intensity of pixels to create a first image of a first object made up of low intensity pixels representing the area of dark chromatin and a second image of a second object of higher intensity pixels representing the area of light chromatin.

2. A method according to claim 1, wherein the low intensity pixels are the pixels having an intensity up to a first determined value and the higher intensity pixels are the pixels having an intensity from the first determined value to a second determined value, the first and second determined values being determined from the fitting parameters.

3. A method according to claim 2, wherein the first determined value is intensity value of the midpoint between the low intensity peak and the middle intensity peak and the second determined value is the midpoint between the middle intensity peak and the high intensity peak.

4. A method according to claim 1, wherein the step of determining characteristic data further comprises determining characteristic data characterising the shapes of the first object and/or the second object.

5. A method according to claim 4, wherein the predetermined characteristic data includes at least one of the following parameters of the first object and/or the second object:
the Area of the object;
the Centroid of the object;
the length in pixels of the major axis of the object;
the length in pixels of the minor axis of the object;
the eccentricity, that is the ratio of the distance between the foci of the major and minor axis of the object;
the area of the convex hull representation of the object;
the area of the area contained within the boundary of the object;
the equivalent diameter of a circle with the same area;
the proportion of the area of the convex hull that are also in the object;
the proportion of the area of object that are in the bounding box; and
the Perimeter of the object.

6. A method according to claim 1, wherein the step of capturing an image uses a 2D digital imaging device.

7. A method according to claim 1, wherein the step of capturing an image using a linear scanning system as the imaging device.

8. A method according to claim 1, wherein the cell nuclei used is a monolayer.

9. A method according to claim 1, wherein the cell nuclei used is a serial section.

10. A method according to claim 1, wherein the image is a greyscale image.

11. A method according to claim 1, wherein the image is a colour image.

12. A method according to claim 1, wherein the step of capturing an image includes preparing the cell nuclei using a stain used for bright field microscopy.

13. A method according to claim 1, wherein the step of capturing an image includes preparing the specimen is using a fluorescence stain.

14. A computer program product recorded on a non-transitory data carrier, wherein the computer program product is adapted, when run on a computer connected to imaging apparatus, to cause the computer and imaging apparatus to carry out the steps of:
capturing an image of cell nuclei with the imaging apparatus;
segmenting the image to identify individual nuclei in the computer;
fitting three intensity peaks of the pixels of the image of individual nuclei to the histogram of number of counts against image intensity, the three intensity peaks being low, middle and high intensity peaks and being represented by fitting parameters in the computer;
determining characteristic data, wherein some of the characteristic data is determined from the fitting parameters; and
separating in the computer the image of the individual nuclei by intensity of pixels to create a first image of a first object made up of low intensity pixels representing the area of dark chromatin and a second image of a second object of higher intensity pixels representing the area of light chromatin.

15. A computer program product according to claim 14 wherein the computer program product is further adapted, when run on a computer connected to imaging apparatus, to cause the computer and imaging apparatus to carry out the step of:
determining a first determined value and a second determined value from the fitting parameters;
wherein in the step of separating in the computer, the low intensity pixels are the pixels having an intensity up to the first determined value and the higher intensity pixels are the pixels having an intensity from the first determined value to the second determined value.

* * * * *